United States Patent
Apollonsky et al.

(10) Patent No.: US 7,139,757 B1
(45) Date of Patent: Nov. 21, 2006

(54) CONTEXTUAL RELEVANCE ENGINE AND KNOWLEDGE DELIVERY SYSTEM

(75) Inventors: Alex Apollonsky, Rego Park, NY (US); Warren Braunig, Shreveport, LA (US); Karl Cremin, San Jose, CA (US); Eric Hoffert, South Orange, NJ (US); Ray Tenenbaum, San Francisco, CA (US)

(73) Assignee: The Procter & Gamble Company, Cincinnati, OH (US)

( * ) Notice: Subject to any disclaimer, the term of this patent is extended or adjusted under 35 U.S.C. 154(b) by 700 days.

(21) Appl. No.: 10/027,471

(22) Filed: Dec. 21, 2001

(51) Int. Cl.
*G06F 17/30* (2006.01)

(52) U.S. Cl. .......................... 707/7; 707/3; 707/104.1; 707/203; 704/9

(58) Field of Classification Search .................... 707/7, 707/3, 4, 5, 10, 6, 100, 103, 200, 575, 104.1, 707/102, 104, 201, 202, 511
See application file for complete search history.

(56) References Cited

U.S. PATENT DOCUMENTS

2003/0050929 A1 * 3/2003 Bookman et al. .............. 707/7
2003/0061028 A1 * 3/2003 Dey et al. ...................... 704/9

* cited by examiner

*Primary Examiner*—Charles Rones
*Assistant Examiner*—Belix M. Ortiz
(74) *Attorney, Agent, or Firm*—Leonard W. Lewis (57) ABSTRACT

A method and apparatus are described for providing a user with contextually relevant content from a library of information. According to one embodiment of the present invention, metadata tagged information about a user's work profile and working context, and content within a library of information are read. The metadata tagged information about content within the library of information to metadata tagged information about one or more of the user's work profile, the user's working context, or other content within the library of information is matched using one or more programmable rules. A rank ordered set of the most contextually relevant content from the library of information is then delivered to the user based on the matching of the metadata tagged information.

71 Claims, 6 Drawing Sheets

CONTEXTUAL RELEVANCE ENGINE AND KNOWLEDGE DELIVERY SYSTEM

FIELD OF THE INVENTION

The invention relates generally to the fields of business process automation, workflow, project automation and computer databases. More particularly, the invention relates to a contextual relevance engine for providing related knowledge to a user based on a user's work profile and their working context.

BACKGROUND OF THE INVENTION

Companies typically generate a large amount of information, for example, related to marketing. Historically, companies have developed hard-copy binders of work information, with specific guidelines and information, and descriptions of responsibilities for individual workers. These hard-copy binders are cumbersome to update and to distribute. In addition, the information is presented in one or more volumes without regard to the context of a user's specific work tasks at a particular point of time. As a result, users typically underutilize these materials.

Of course, this information may be organized in an electronic database. This database may constitute a large corpus of knowledge and templated work processes organized, for example, in a hierarchical manner. Such data may reside in a corporate intranet or knowledge management system. However, such a database is typically cumbersome to maintain and utilize, has many limitations, and typically produces limited adoption for the intended user base. For example, a user must perform a sufficiently specific query to generate results relevant to his work to be of use. A more useful system would be one that automatically generates results based on a user's working context so that the user need not generate queries or rely on a set of one-size-fits-all queries.

There are technologies available to personalize a web site visit according to the needs and interests of a known or anonymous website visitor. These technologies may be used for corporate portals to present a customized and personalized view into a set of corporate data sources or for tailored and customized delivery of relevant documents to a user's computing device. However, none of these approaches is focused on the automatic delivery of contextually relevant work information, supporting the completion and execution of specific work projects, tasks, and sub-tasks, drawing upon a large corpus of hierarchically organized knowledge and templated work processes.

Therefore, a method to automatically assemble workbooks "on the fly", in real-time, electronically, across an enterprise, and to present job-related information, in context, when a user is executing a task and needs access to specific work information would be useful. Such an approach would accelerate the user's access to work information to support completion of work tasks in a unique and powerful manner. Additionally, such an approach would also allow for centralizing and distributing knowledge for an extended enterprise workforce that is subject to high levels of attrition, turnover, dispersion, and reorganization.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION OF THE INVENTION

A method and apparatus are described for providing a user with contextually relevant content from a library of information. According to one embodiment of the present invention, metadata tagged information about a user's work profile and working context, and content within a library of information are read. The metadata tagged information about content within the library of information is matched to metadata tagged information about one or more of the user's work profile, the user's working context, or other content within the library of information using one or more programmable rules. A rank ordered set of the most contextually relevant content from the library of information is then delivered to the user based on the matching of the metadata tagged information and the relative weight of different factors within the rule.

Relevant knowledge is delivered to a user in a form of a "workbook" that is a set of documents, pages, applications, forms etc delivered to a user based on his or her work profile, and the current context the user is working in through one or more rules defined for this context. The following four types of workbooks are supported: a "Project Workbook" that is the knowledge delivered to a user in the context of a Project the user is working on; a "Task Workbook" that is the knowledge delivered to a user in the context of a Task the user is working on; a "Subtask Workbook" that is the knowledge delivered to a user in the context of a Subtask the user is working on; and finally a "Document Workbook" that is the knowledge delivered to a user in the context of a piece of Content the user is working on.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various processes, which will be described below. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnetic or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while embodiments of the present invention will be described with reference to a database or library of information containing marketing information, the method and apparatus described herein are equally applicable to databases containing large amounts of other types of information to be supplied to a user in a contextually relevant manner. For example, rather than marketing data, the database may contain financial data, accounting guidelines, spreadsheet templates, and other content for use by an accounting department or financial managers.

Briefly, embodiments of the present invention provide for the delivery of contextually relevant work materials and business processes to end-users. The delivery of work materials is configurable and may be personalized. The user interaction with a tailored, personalized "workbook" is driven by the user's work profile, available system content and metadata, and a rules database. The available system content, as will be described below, may include documents and other work materials such as workflow templates, document templates, static best practices, wizards, case studies, tools and applications.

According to embodiments of the present invention, there are three areas of information to be combined. These areas include information about the user, information about the user's context, and information about an asset or document. Information about the user may include details such as who, where (geographically), experience, area of expertise, title, division/group, etc. Information about the user's context, or task at hand, may indicate what type of project the user is working on as well as what task the user is doing at that moment, such as developing a strategy, analyzing results of a new campaign, or writing a document to be shared with others. Information about the asset or document may include details of the asset or document, its contents, and any attributes or metadata tags associated with the document. These three elements, when processed by a rules engine, allow the right information to be delivered to the right person at the right time.

According to embodiments of the present invention, there are four different types of user content: a project context; a task context; a sub-task context; and a document context. The project context relates to a user working on a particular project. The task context relates to a user working on a particular task within a project. The sub-task context relates to a user working on a particular sub-task within a task. The document context relates to a user viewing a particular document. The document may reside, for example, in a personal folder, company folder, knowledge center or team folder. Relevant content can be delivered to the user in any of these contexts.

Embodiments of the present invention include a contextual relevance engine, a set of programmable rules, and a knowledge center. Briefly, the contextual relevance engine matches a user's work profile and project or task or document context to a library of knowledge and produces a rank-ordered set of contextually relevant work materials. The set of programmable rules defines the functional mapping of user metadata, such as a user's geography, expertise, and responsibilities, and task context to the library of knowledge. The knowledge center contains a library of knowledge, covering a breadth and depth of expertise. The knowledge center contains an organized collection of information that can be browsed, searched and provided "in context" to work processes. Contextually relevant materials can also be presented directly within the knowledge center so that a user working in this area of the system will see a variety of content related to the current content that they are accessing. Details of each of these components will be discussed in greater detail below.

Figure 1:
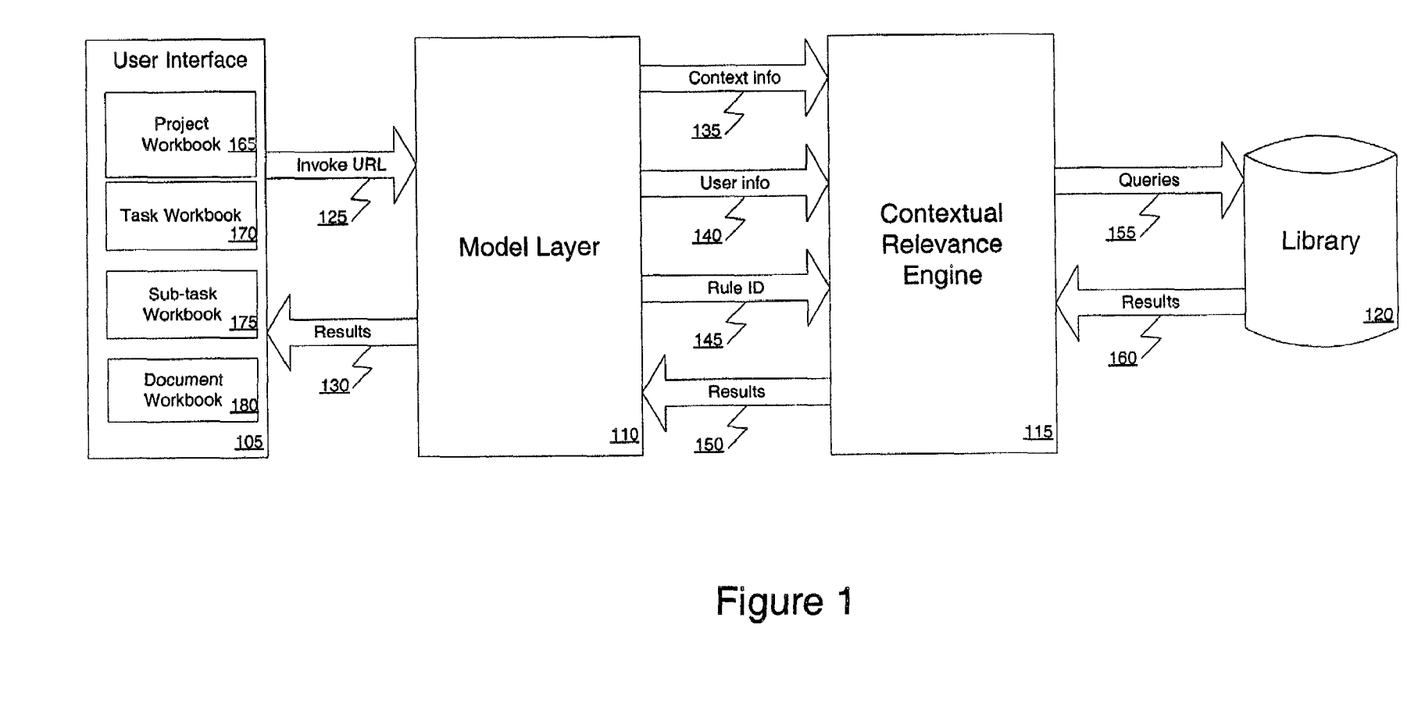
FIG. 1 is a block diagram illustrating a system for providing a user with contextually relevant content from a library according to one embodiment of the present invention.

FIG. 1 is a block diagram illustrating a system for providing a user with contextually relevant content from a library according to one embodiment of the present invention. This system includes a user interface 105, a model layer 110, a contextual relevance engine 115, and a database or library of information 120. Generally, the contextual relevance engine 115 delivers a relevant collection of materials to a user via the user interface 105 from a larger collection of content stored in the library of information 120. The user interface 105 allows a user to request information and view results. The model layer 110 provides an interface between the user interface 105 and the contextual relevance engine 115. Each of these elements, as well as the data flow between them will now be described in greater detail.

The contextual relevance engine 115 provides an ability to dynamically retrieve objects from the library 120 that are associated with each other via metadata. The contextual relevance engine 115 uses configurable rules to identify what objects and what metadata will participate in the retrieval process. The rules determine the knowledge and expertise that is automatically delivered to an end user from the library.

The content stored in the library 120 may include a combination of work materials such as workflow templates, document templates, static best practices, wizards, case studies, tools and applications. A large library of default workflow templates may be provided for common tasks and processes. For example, in a marketing context, these templates may include: Targeted Marketing and Promotions; Media Planning; Advertising Development; Public Relations; Packaging Design; Strategy Development; and Concept Development. The initial set of marketing processes may include processes and content in primary topic areas such as Product Launch Initiatives, Strategy Development and Deployment, Brand Building, Advertising Development, Media Planning, Promotions, Pricing, Public Relations, Data Analysis, and Direct Marketing. This default library of workflow templates may be available as standard when a user creates a project or a specific action item (depending on the context). The specific workflow templates available by default are configurable.

According to one embodiment of the present invention, a user repository containing the library of information may reside fully in a centralized database or at a customer location. The user repository, if located at a customer location, can be synchronized with the centralized database and its user records on an initial and ongoing basis.

Contextually relevant information will be retrieved from this library 120 by mapping a user's roles and responsibilities against the broad collection of available information within the library 120. For example, in a marketing context, an assistant brand manager in the consumer packaged goods industry who is working on direct marketing promotions will see specialized materials and workflow that are associated with these specific areas. In another example, a Vice President of Marketing for a financial services firm who is in the process of overseeing a major advertising initiative will see a completely different set of materials and workflow based on her specialization and task context.

According to one embodiment of the present invention, each rule used by the contextual relevance engine 115 is stored in a database as an object of type Rule. The rules may be imported by an import utility as part of a setup process. The rule definition for the export/import process may be presented in XML format. There can be a wide variety of rules stored in the database and available for selection to control the metadata mapping process.

According to one embodiment of the present invention, a user is presented a web page containing a number of Uniform Resource Locators (URLs) by the user interface 105. These URLs are used to invoke a particular rule in a particular situation. The URL used to invoke a rule may contain information such as the action to be taken and the ID of the rule in the rules repository. Each URL may be associated with a button or functional screen area on the user interface 105. The user, through the user interface 105, selects a URL to invoke a particular rule. The selected URL 125 is then sent to the model layer 110.

The model layer 110 receives the selected URL 125 and uses it to generate context information for use by the contextual relevance engine 115. A user's current context information may include information such as a project ID for a project the user is currently working on, a task ID for a task the user is currently working on, sub-task ID for a sub-task the user is currently working on, and document ID for a document the user is currently viewing. The selected URL and user context information are used to perform a lookup and determine the appropriate rule ID. The current context information 135 and current user information 140, such as user ID, are passed to the contextual relevance engine 115 along with the rule ID 145. The rule ID 145 is used to identify and retrieve metadata associated with a particular object in the system.

The contextual relevance engine 115 retrieves a rule from the rules repository corresponding to the rule ID 145. The engine 115 parses the rule and, using the context information and user information, generates a query. The engine then executes the query 155 on the library of information to find content relevant to the user's current context. The results 160 of the query may include a relevance number returned with each piece of content. The contextual relevance engine compares the relevance number to a threshold or "hurdle" number. According to one embodiment of the present invention, the hurdle number is equal to $\frac{1}{3}$ to $\frac{1}{2}$ of a maximum relevance number. If the relevance number exceeds the hurdle then the content is deemed to be relevant and is to be added to the list of relevant content. If the relevance number is below the hurdle then the content is deemed to be irrelevant and is not added to the list of relevant content. The contextual relevance engine will sort the results based on the relevance and pass the results 150 back to the model layer 110 which then passes the results 130 back to the user interface 105.

Delivering a rank ordered set of contextually relevant content from the library of information may consist of presenting a dashboard area in the user interface. This dashboard area may aggregate a variety of metadata, content, and applications based on the user's working context. The dashboard may represent a project dashboard when the user is focusing on a specific project, a task dashboard when the user is focusing on a specific task, a sub-task dashboard when the user is focusing on a specific sub-task, a file dashboard when the user is focusing on a specific file, or a folder dashboard when the user is focusing on a specific folder.

As indicated above, relevant knowledge is delivered to a user via the user interface 105 in the form of a "workbook" that is a set of documents, pages, applications, forms etc delivered to a user based on his or her work profile, and the current context the user is working in through one or more rules defined for this context. Four types of workbooks are supported: a "Project Workbook" 165; a "Task Workbook" 170; a "Sub-task Workbook" 175; and a "Document Workbook" 180. The "Project Workbook" 165 is the knowledge delivered to a user in the context of a Project the user is working on. The "Task Workbook" 170 is the knowledge delivered to a user in the context of a Task the user is working on. The "Sub-task Workbook" 175 is the knowledge delivered to a user in the context of a Subtask the user is working on. Finally, the "Document Workbook" 180 is the knowledge delivered to a user in the context of a piece of Content the user is working on.

Providing contextually relevant content to a user, according to embodiments of the present invention, utilizes three types of information: metadata tagged information about the content of the library; metadata tagged user work profile information; and metadata tagged information about the user's working context. As will be described below, various combinations of these types of data may be considered when matching relevant content to a user's context.

Metadata tagged information about the content of the library may be uploaded into the system from a user through an application support mechanism or from a set of export/import utilities. The content within the library may be of various types including: documents such as white papers, case studies, examples, reports, training modules, and spreadsheet-based calculators; programmed modules such as check lists, score cards, web-based calculators, wizards, and web-based training modules; web forms; tools; and alternative views of content such as a print view or print-friendly version, a form template such as the Microsoft Word version of the web form, or a downloadable view. The alternative view of a particular asset is a full-scale managed asset that can be checked out and checked in, placed in a particular folder and so on. The permissions and metadata on the Alternative View is managed independently of the original asset. The Alternative View is mapped to the original asset via the Contextual Relevance engine through the same Content ID and appropriate Content Type fields.

Therefore, metadata fields identifying the contents may include system-assigned or user-selected fields: a content ID that is unique per particular piece of content; a primary object type such as "Document", "Programmed Module", "Tool", "Web Form", etc.; a content type such as "White Paper", "Case Study", "Example", "Report", "Check Lists", "Score Cards", "File-based Calculator", "Web-based Calculator", "Wizard", "Training Module", "Web-based Training Module", "Web Form", "Tool", "Print View", "Form Template"; a project stage; relevant keywords; a marketing category, subcategory, and marketing activity; and customer configurable fields like brand, geography, and business unit. The user may also assign free-form text entry data about the document: a title; a description; and any notes or comments. In addition, the contextual relevance engine examines the full text of the asset as part of its rule.

Metadata tagged user work profile information may include a user field such as a user's login created in the system and assigned metadata when a user account is created or edited by a system administrator, by a self administration tool, or by synchronizing with a pre-existing user directory. The work profile of a user may also include standardized user metadata. For example, in a marketing context, the metadata may include the user's industry segment, brand, job category, years of experience, geography, and marketing and domain expertise. This type of job-driven metadata may drive much of the user's work experience in the system. Users may also be able to extend their work profile to include metadata for areas of marketing interest such as interests in specific topics like "field marketing" or "advertising development" or textual descriptions of expertise and areas of endeavour. The combination of both types of metadata, as will be discussed below may be used to deliver material that is relevant to a user's responsibilities for getting key work done, but may also allow for learning, exploration and the serendipity of new areas as a supporting feature. In this manner, the system functions as an "intelligent guide" for the user.

Metadata tagged information about the user's working context or workflow may be associated with particular steps of a workflow. Workflow should be identified and have metadata assigned to the particular step. Workflow metadata might be of a type of project, description, objectives, etc. Each workflow contains tasks with each task assigned keywords like stage, activity, etc. The overall workflow model may support different types of workflows such as a fixed workflow, an ad-hoc workflow, or a configurable workflow. Contextually relevant content and applications can be provided to the user in any of the workflow models, fixed, ad-hoc and configurable. In a fixed workflow, the tasks and sub-tasks are all predefined and cannot be changed by the users. The steps in the workflow are executed to complete the workflow. This type of workflow may also be called a "Readymade Project" or a "Standard Project". A fixed workflow is often deployed on a broad scale across an enterprise and may involve usage from hundreds or thousands of individuals. In an ad-hoc workflow users develop a workflow "from scratch", building up a definition of a work process, step by step, assembling all of the elements starting with an empty container. This type of workflow is typically used in a small project team environment, usually for short projects of limited scope and generality. In a configurable workflow, users start with a fixed workflow definition, but they have the ability to add, delete or modify existing workflow steps. This provides a great deal of flexibility and configuration for building a new project initiative. This workflow type is started by use of a "Readymade Project" which is then configured to meet the specific needs of a specific workgroup.

Figure 2:
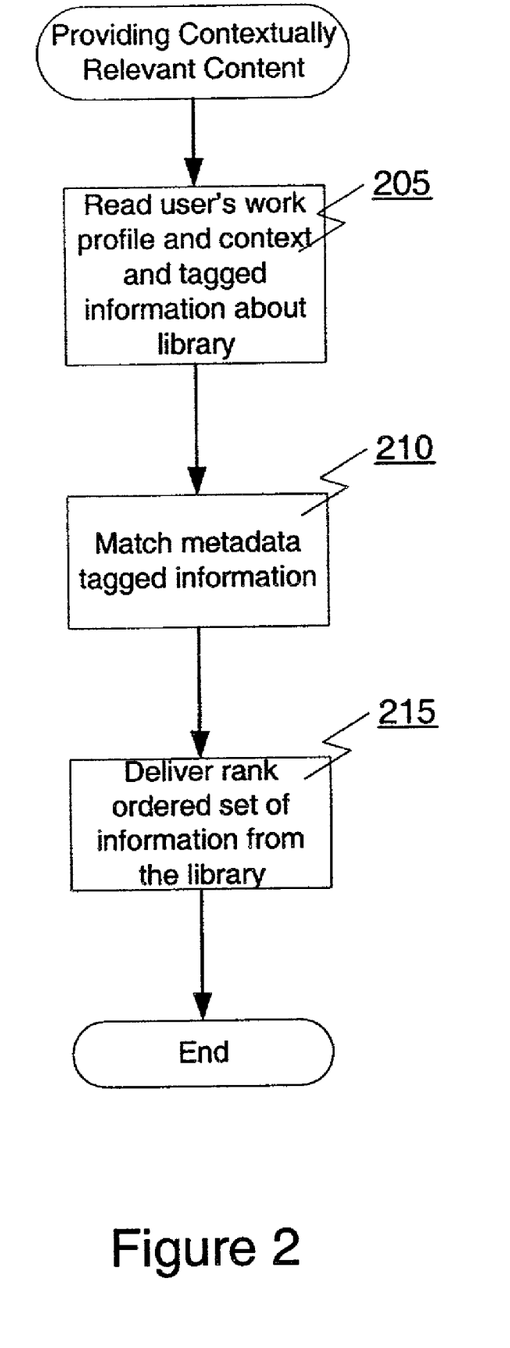
FIG. 2 is a flowchart illustrating a process for providing a user with contextually relevant content from a library according to one embodiment of the present invention.

FIG. 2 is a flowchart illustrating a process for providing a user with contextually relevant content from a library according to one embodiment of the present invention. First, at processing block 205, metadata tagged information about a user's work profile and working context and content within the library of information are read. At processing block 210, the metadata tagged information about content within the library of information is matched with metadata tagged information about one or more of the user's work profile, the user's working context, or other content within the library of information using one or more programmable rules. The matching process will be described in greater detail below with reference to FIG. 3. Finally, at processing block 215, a rank ordered set of the most contextually relevant content from the library of information is delivered to the user based on the matching of the metadata tagged information.

Figure 3:
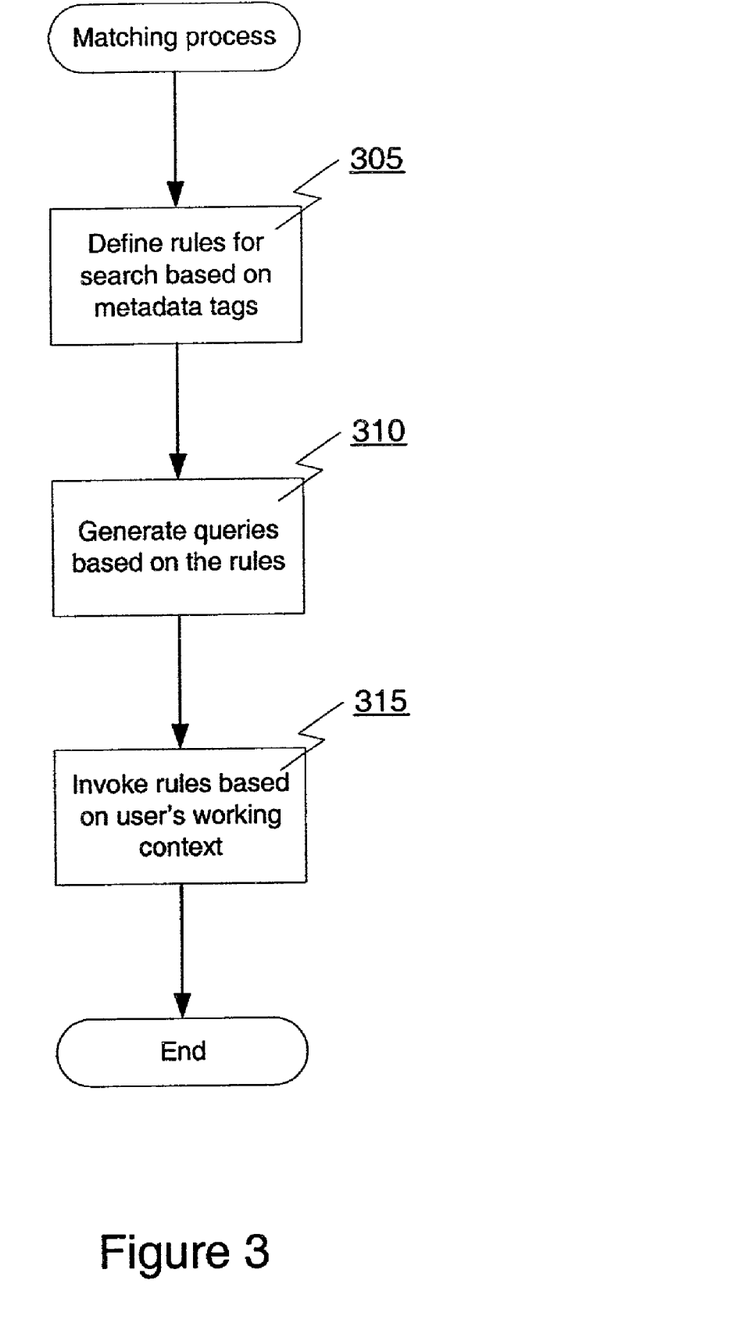
FIG. 3 is a flowchart illustrating a process for matching a user's working profile and context with content from a library according to one embodiment of the present invention.

FIG. 3 is a flowchart illustrating a process for matching a user's working profile and context with content from a library according to one embodiment of the present invention. First, at processing block 305, one or more rules are defined to determine a subset of the information to be searched based on the metadata tagged information about the user's work profile and working context. Next, at processing block 310, a set of queries is generated for searching the library of information based on the set of rules. Finally, at processing block 315, the rules are invoked based on the user's working context.

According to one embodiment of the present invention, rules are created by writing an Extensible Mark-up Language (XML) description of the rule. After defining the rules in XML a utility may be run to translate the XML into internal database language like Structured Query Language (SQL) to create queries for the database. These queries correspond to the rules but are optimized for execution in the database to allow quick execution.

As described above, the rules are defined with unique IDs. When selected by a user, the rule is invoked by its rule ID and the queries are performed. Particular rules may be invoked based on the user selecting or clicking on particular links or buttons displayed by the user interface.

A default set of configurable rules may be supplied, and may be modified or replaced by the user. In this way the user may define behavior for his environment. When defining a rule, the current user's metadata can be included in the rule. For example, a rule may specify retrieving documents with a marketing category equal to the current user's marketing category. Additionally, the rule can include a parent's metadata into rule. For example, if a user is working on a task and the task belongs to a particular project, both the task and project metadata can be used within the rule.

As described above, the contextual relevance engine will return a relevance number associated with each document. The relevance may be affected by various factors like the weight of the metadata field, a field score, the type of match specified. The weight of the metadata field may be along a numerical range such as 1–10 or 1–100 which is associated with the metadata field in a field catalog and/or directly in the rule. The most significant field may have highest weight. The field score may be calculated based on the metadata field weight and the number of values that matched a condition for that metadata field.

The clause for the particular field in the rule may specify various types of matches such as "matches", "matches all", "optional matches", "matches text", or "optional match". "Matches" means at least one value, where the value is a selection choice for a field in the database, should match. If none match, the content will not be returned. More matches for a piece of content may mean a higher relevance score. This may also be called "Required to match".

"Matches all" or "hard matches" means all values of specified metadata fields should match. If all values do not match, the content will not be returned. This may also be called "Exact match".

"Optional match" means that a match is not required. If the metadata matches, it is scored. More matches mean a higher relevance score. However, if no single match is found, the content need not be excluded.

"Matches text" or "soft matches" is a match that breaks text strings of descriptions of the text into component words excluding basic words, conjunctions, prepositions, etc. and matches them to search criteria. More matches mean a higher relevance score. If no single match is found the content is excluded.

"Optional text" is an optional match that breaks text strings into component words, excluding basic words, conjunctions, prepositions, etc. If the metadata matches, the content is scored. More matches mean a higher relevance score. However, if no single match is found, the content need not be excluded.

Figure 4:
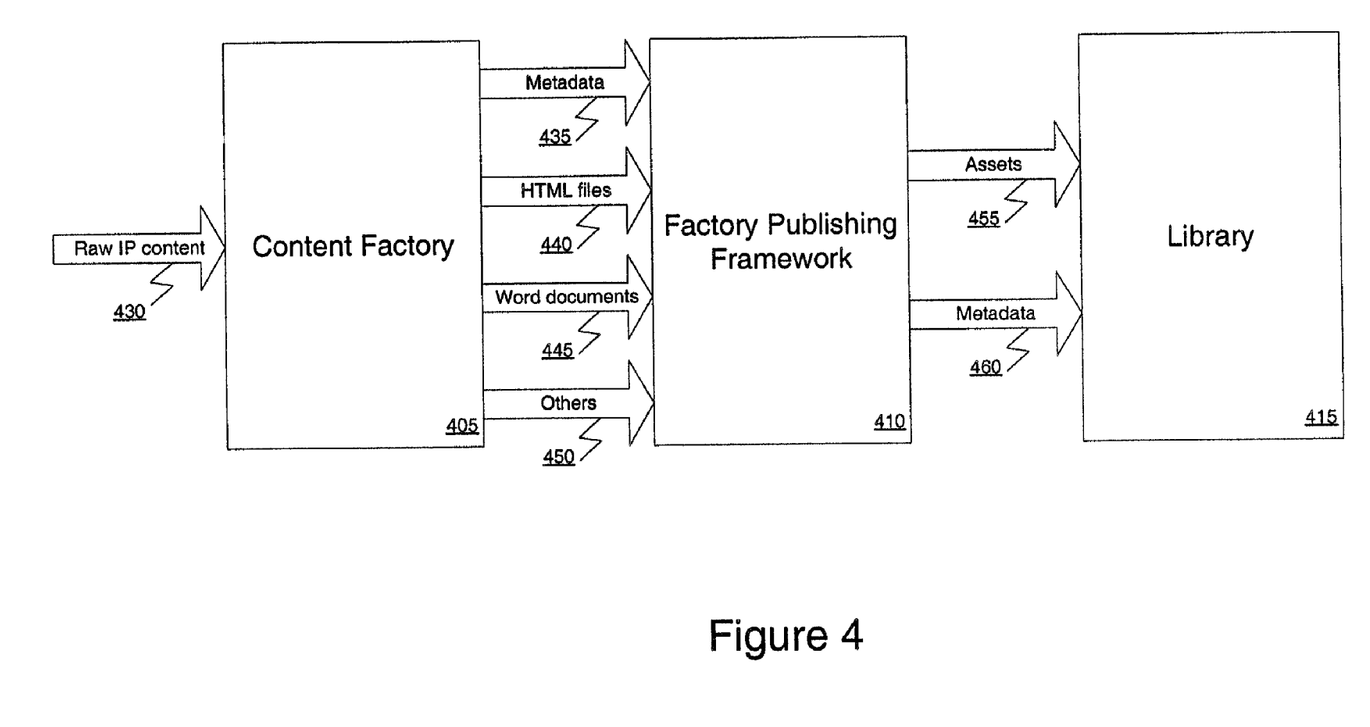
FIG. 4 is a block diagram illustrating a system for maintaining a library of information according to one embodiment of the present invention.

FIG. 4 is a block diagram illustrating a system for maintaining a library of information according to one embodiment of the present invention. This system is used to perform an authoring and editing process. The system consists of a content factory 405, a factory publishing framework 410, and a library of content 415.

First, a user supplies the content factory 405 with the raw information content 430 such as a treatise on advertising, tips, or any type of information in any form from any source. The user then sifts the content 430. That is, the user of the content factory 405 determines what content is usable, what to do with it, how to make it something that the end user can access, and how to make it usable in a web-based environment.

Once the content factory has the raw information content, various users interact with the content factory to modify the raw content. A domain expert, an expert in a specific field or area, according to a strategic plan for each topic, rewrites the raw material while adding his own perspective and insight to make the material richer. Another domain expert verifies and audits the content of the first domain expert's product, helping to refine or improve it. A copy editing process then adjusts the tone and voice of the content to ensure consistency with other content in the library. An HTML developer then creates a web-based version of the content. For example, a template may be turned into an HTML form. A metatagging process then assigns attributes to the content describing the content so that the contextual relevance engine may later find the content. The result of this process is content in web-ready format with metatags. Fields in a form may be stored as XML or as database fields.

All metadata 435, HTML files 440, Microsoft Word documents 445, and other content 450 are then, following the factory publishing framework 410, written into two files. One file contains all assets or content. The other file contains the associated metadata for the content. The asset file 455 and the metadata file 460 are then written to the library 415 for later use by the contextual relevance engine.

According to one embodiment of the present invention, the system metadata model includes support for a default set of metadata for major classes of objects important to a database. For example, in a marketing database, major classes may be brand assets, folders, projects, action items and people. The object types may also include wizards, applications and tools, document templates, project templates, web page templates, training tools, user metadata, files and folders, and project/action items.

A wizard may be represented as a series of steps where each step can have files, text, graphics, display text, text to be entered by a user, application behavior, links to external tools, exception handling, etc. To support the requirements of a wizard, an XML metadata model and data structure may be used. This is a meta-level object with asset lists, metadata categorization, snippets of text and graphics for display, XML style sheets or suitable templates to drive rendering of pages, and the ability to be used as a wizard.

Applications and tools may represent internal corporate applications, external web applications or tools, or combinations of both. Applications and tools may have invocation methods and may be stored with information about the application (e.g., login, system specifications). In addition, applications and tools may be tagged with metadata similar to that of a document (for example: marketing category or activity; project stage; expertise keywords; relevance to users at different levels of experience, etc). Applications may have permissions associated with them, may be placed into folders, and may be searchable, like assets and projects. These applications and tools may be delivered to users based on their roles and responsibilities mapped with the metadata of the tools. As with any object, the Tools object is placed in a specific folder, searched for, tagged, shared and so on. The object does not have a document in the database associated with it. Instead, it uses a URL to reference an external web-based application.

Document templates may include any Web- or application-based form, or combination thereof, in which user input into text areas is automatically translated into a document or output page. In a marketing example, document templates for common work tasks such as a creative brief standard template may be built into the system within predefined brand information architecture. There may be a set of generic brand asset files and document templates that can be used in a variety of work tasks.

Project templates may include sets of standardized document templates and forms. These standard document templates may be a permanent component of the project template.

Web page templates may translate various representations of content into rendered and navigable web pages. The concept of a web page template helps present a large collection of rich information as an "easy to read, view and navigate" set of web pages that are delivered to users based on their current work focus.

Training tools can be represented on the system in various formats such as Power Point Presentation, Flash, or Shockwave. These tools may also include a quiz element. The tools can be associated with a project or task. These can be accessible through a shared files area or through a dedicated area of the system.

There may be a large library of default materials and document templates organized into files and folders. The library can contain a broad variety of content types including documents, spreadsheets, presentations, image and rich-media files, like video, audio, web forms, applications, tools, etc. All of the content elements can then be used to construct a dynamic brand workbook. All default assets and web material are tagged with metadata information describing the categories of the information. This allows the appropriate document templates to be delivered to the right class of user.

Figure 5:
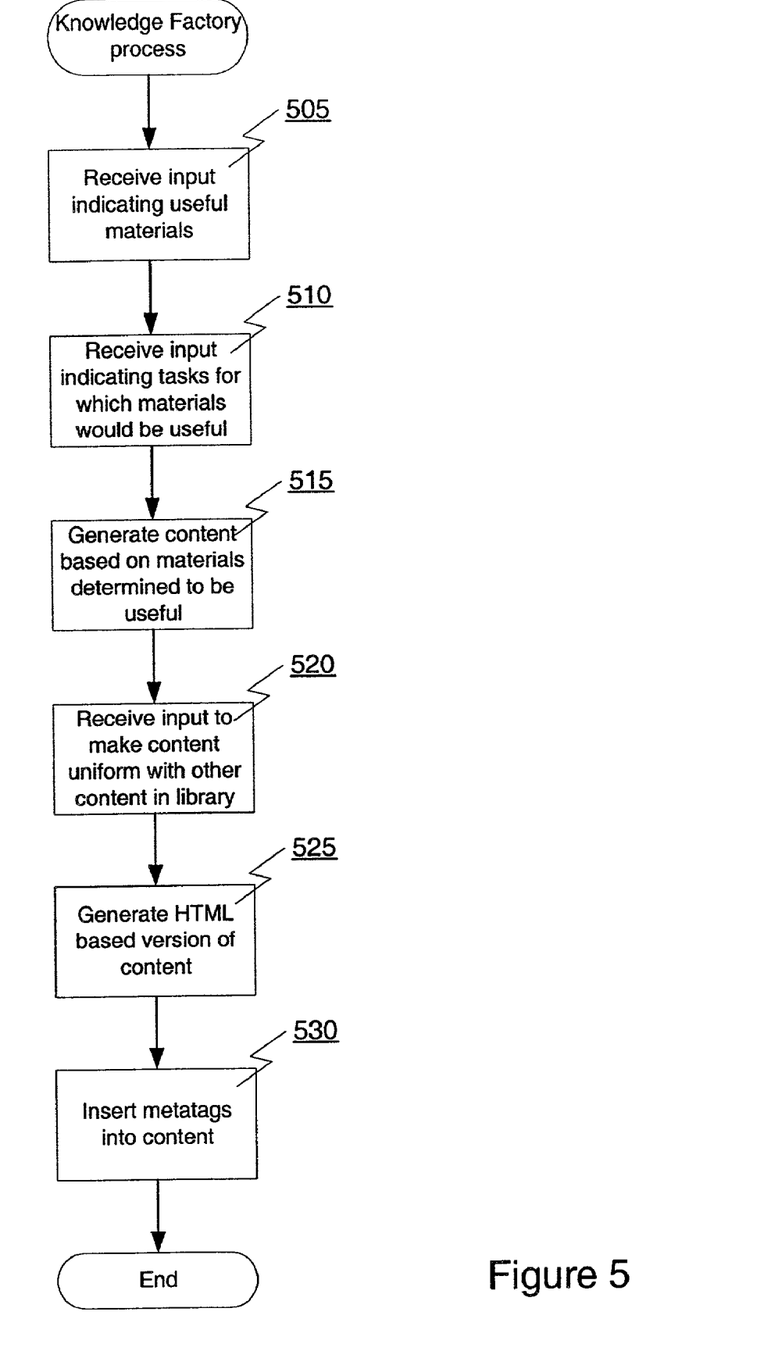
FIG. 5 is a flowchart illustrating a process for maintaining a library of information according to one embodiment of the present invention.

There may be a large library of default workflow templates organized as project/action items. All default workflows are tagged with metadata information describing the categories of the workflow. This allows the appropriate workflow templates to be delivered to the right class of user. FIG. 5 is a flowchart illustrating a process for maintaining a library of information according to one embodiment of the present invention. First, at processing block 505, user input is received indicating materials that are determined to be useful. At processing block 510 input is received regarding tasks for which the materials determined to be useful may be utilized. Next, at processing block 515, content for the library of information is generated comprising the materials determined to be useful and the tasks for which the materials may be utilized. User input is received at processing block 520 to make the content uniform with other information in the library of information. HyperText Markup Language (HTML) version of the content is then generated at processing block 525. Finally, at processing block 530, metadata tags are inserted into the content, the metadata tags indicating the type of information present in the content and the tasks for which the material may be utilized.

According to one embodiment of the present invention, to facilitate matching of metadata, the programmable rules each have a unique identifier (rule ID), a name, and a set of clauses defining the operations of that rule. Each clause of the set of clauses may be two or more of: a name identifying the metadata field to be matched or operator to be performed; a weight to be applied to the metadata field if a match is found; an operator to act on the metadata field to be matched; and a value for a field representing context. According to one embodiment of the present invention, the weight of a metadata field may be represented by a number from 1 to 10.

In some implementations, a clause may include all of a name, a weight, an operator, and a value. In other implementations, the clause may include a value forming a portion of a Boolean expression, and a name representing an operator used to combine all of the clauses. According to another embodiment of the present invention, the operator may comprise a Boolean operator or, as will be described below, may indicate the type of match to be performed. According to one embodiment of the present invention, the position of a user in the user interface results in the use of a lookup table to identify a matching programmable rule ID from a rules repository, where the rule ID is used to control a contextual relevance algorithm that will be applied in the user interface. The various combinations of rule ID, name, and clauses are used by a rules engine in the process of finding and delivering contextually relevant content to a user.

Figure 6:
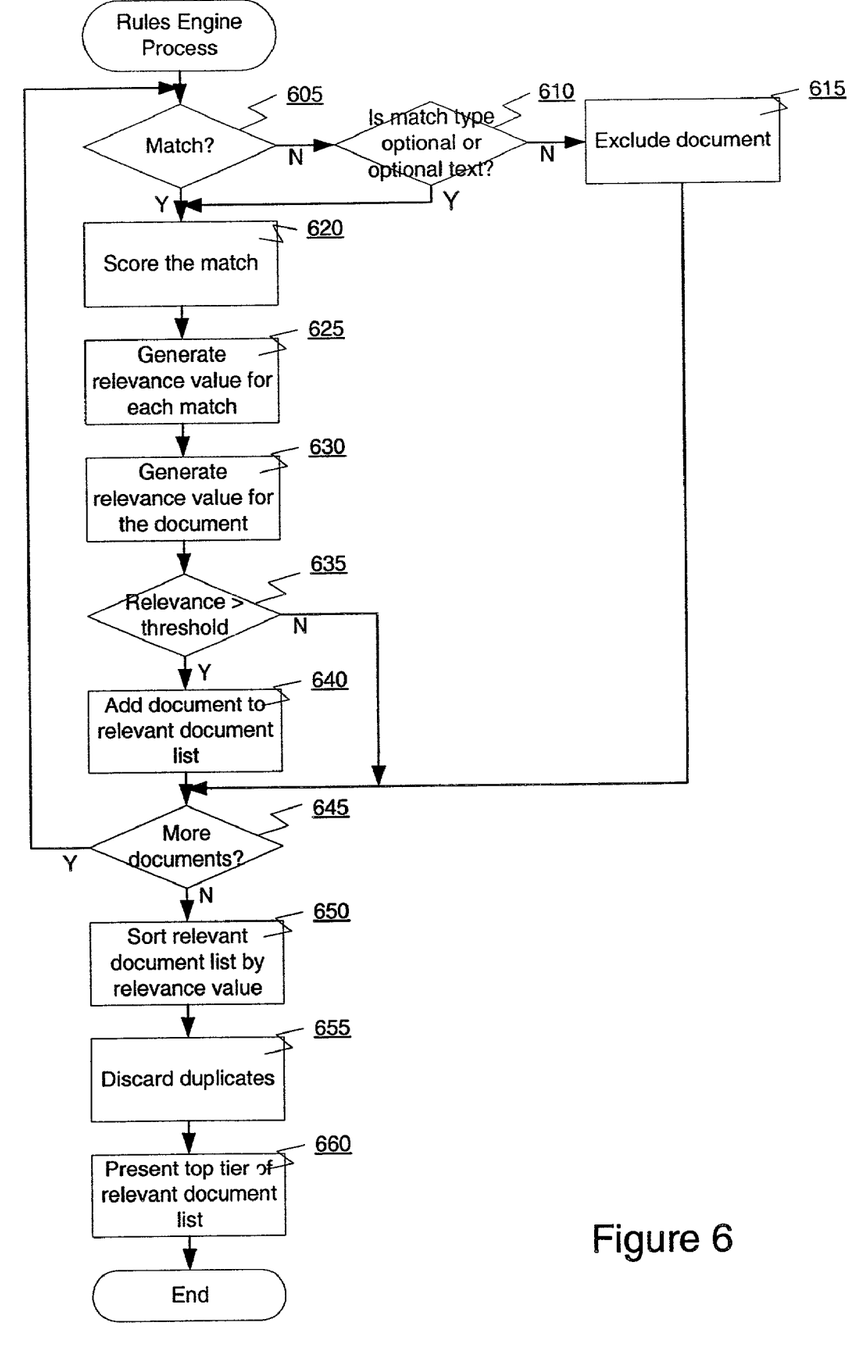
FIG. 6 is a flowchart illustrating a process for a programmable rules engine according to one embodiment of the present invention.

FIG. 6 is a flowchart illustrating a process for a programmable rules engine according to one embodiment of the present invention. First, at decision block 605, a determination is made as to whether the current document matches the user's context based on the metadata and invoked rule. As described above, the type of matching performed, indicated by the invoked rule's operator, may include a "matches all", "matches", "optional", "optional text", and "matches text" matches. The "matches all" match compares two or more values and excludes a document associated with the value if non-matching values are found. The "matches" match compares two or more values, accumulates a score for matches found, and excludes a document associated with the values if no matches are found. The "optional" match compares two or more values and accumulates a score for matches found. The "optional text" match breaks text strings associated with a document into component words excluding basic words, conjunctions, and prepositions and accumulates a score for matches found. The "matches text" match breaks text strings associated with a document into component words excluding basic words, conjunctions, and prepositions, accumulates a score for matches found, and excludes a document associated with the values if no matches are found.

Therefore, if no match is found at decision block 605 and the match type is found to be other than "optional" or "optional text" at decision block 610, the document is excluded at processing block 615. However, if a match is found at decision block 605 or the match type is determined to be "optional" or "optional text" at decision block 610, the match is scored at processing block 620.

Next, at processing block 625, a relevance value for each match is generated by combining the weight of matching metadata fields and the number of values that match those on the document of interest for matching. At processing block 630 a single relevance value is generated and assigned to the document. If, at decision block 635, the relevance value for a document exceeds a pre-defined threshold, the document is deemed to be relevant and is included in a list of relevant documents at processing block 640. If, at decision block 635, the relevance value for a document does not exceed a pre-defined threshold, the document is deemed to be irrelevant and is not included in the list of relevant documents. According to one embodiment of the present invention, the predefined threshold may be represented by a number from 1 to 100.

At decision block 645, a determination is made whether more documents remain to be checked. If more documents the library of information are to be checked, processing returns to decision block 605. If all documents have been checked, processing continues to processing block 650.

At processing block 650 documents deemed to be relevant are sorted by relevance, from most relevant to least relevant. Duplicate entries in the list of relevant documents are discarded at processing block 655. Finally, at processing block 660, the user is presented relevant documents from a top tier of the list of relevant documents.

What is claimed is:

1. A method comprising the steps of:
   maintaining a library of information;
   reading metadata tagged information about a user's work profile and working context and content within the library of information;
   matching the metadata tagged information about content within the library of information to metadata tagged information about one or more of the user's work profile, the user's working context, or other content within the library of information using one or more programmable rules; and
   delivering to the user a rank ordered set of the most contextually relevant content from the library of information based on the matching of the metadata tagged information, wherein the one or more programmable rules each have a unique identifier (rule ID), a name, and a set of clauses defining the operations of that rule.

2. The method of claim 1, wherein each clause of the set of clauses comprises two or more of:
   a name identifying the metadata field to be matched or operator to be performed;
   a weight to be applied to the metadata field if a match is found;
   an operator to act on the metadata field to be matched; and
   a value for a field representing context.

3. The method of claim 2, wherein a clause comprises all of a name, a weight, an operator, and a value.

4. The method of claim 2, wherein the clause comprises a value forming a portion of a Boolean expression, and a name representing an operator used to combine all of the clauses.

5. The method of claim 4, wherein the operator comprises a Boolean operator.

6. The method of claim 4, wherein the operator comprises a "matches all" match that compares two or more values and excludes a document associated with the value if non-matching values are found.

7. The method of claim 4, wherein the operator comprises a "matches" match that compares two or more values, accumulates a score for matches found, and excludes a document associated with the values if no matches are found.

8. The method of claim 4, wherein the operator comprises an "optional" match that compares two or more values and accumulates a score for matches found.

9. The method of claim 4, wherein the operator comprises an "optional text" match that breaks text strings associated with a document into component words excluding basic words, conjunctions, and prepositions and accumulates a score for matches found.

10. The method of claim 4, wherein the operator comprises a "matches text" match that breaks text strings associated with a document into component words excluding basic words, conjunctions, and prepositions, accumulates a score for matches found, and excludes a document associated with the values if no matches are found.

11. The method of claim 4, further comprising:
generating a relevance value for each match by combining the relative weight of each matching metadata field and the number of values that match the document of interest for matching;
if the relevance value for a document exceeds a pre-defined threshold, deeming the document to be relevant and including the document in a list of relevant documents; and
if the relevance value for a document does not exceed a pre-defined threshold, deeming the document to be irrelevant.

12. The method of claim 11, further comprising sorting documents deemed to be relevant, by relevance, from most relevant to least relevant, and presenting, for display to the user, only a top tier of documents deemed to be most relevant.

13. The method of claim 12, wherein any document that matches itself in the list of relevant documents is discarded and is not presented for display to the user.

14. The method of claim 11, wherein each weight is defined as a number from 1 to 10 and the threshold is defined as a number from 1 to 100.

15. The method of claim 1, wherein a position of a user in a user interface results in the use of a lookup table to identify a matching programmable rule ID from a rules repository, where the rule ID is used to control a contextual relevance algorithm that will be applied in the user interface.

16. The method of claim 1, wherein a user repository containing the library of information may reside fully in a centralized database or at a customer location.

17. The method of claim 16, wherein the user repository, if located at a customer location, is synchronized with the centralized database and its user records on an initial and ongoing basis.

18. The method of claim 4, further comprising generating a relevance value for each match by using the relative weight of each matching metadata field that match the document of interest for matching.

19. The method of claim 4, further comprising generating a relevance value for each match by using the number of values that match the document of interest for matching.

20. The method of claim 4, further comprising generating a relevance value for each match by combining the relative weight of each matching metadata field and the number of values that match the document of interest for matching.

21. The method of claim 18, further comprising:
if the relevance value for a document exceeds a pre-defined threshold, deeming the document to be relevant and including the document in a list of relevant documents; and
if the relevance value for a document does not exceed a pre-defined threshold, deeming the document to be irrelevant.

22. The method of claim 19, further comprising:
if the relevance value for a document exceeds a pre-defined threshold, deeming the document to be relevant and including the document in a list of relevant documents; and
if the relevance value for a document does not exceed a pre-defined threshold, deeming the document to be irrelevant.

23. The method of claim 20, further comprising:
if the relevance value for a document exceeds a pre-defined threshold, deeming the document to be relevant and including the document in a list of relevant documents; and
if the relevance value for a document does not exceed a pre-defined threshold, deeming the document to be irrelevant.

24. A system comprising:
a database to maintain a library of information; and
a contextual relevance engine to read metadata tagged information about a user's work profile and working context and content within the library of information, match the metadata tagged information about content within the library of information to metadata tagged information about one or more of the user's work profile, the user's working context, or other content within the library of information using one or more programmable rules, and deliver to the user a rank ordered set of the most contextually relevant content from the library of information based on the matching of the metadata tagged information, wherein the one or more programmable rules each have a unique identifier (rule ID), a name, and a set of clauses defining the operations of that rule.

25. The system of claim 24, wherein each clause of the set of clauses comprises two or more of:
a name identifying the metadata field to be matched or operator to be performed;
a weight to be applied to the metadata field if a match is found;
an operator to act on the metadata field to be matched; and
a value for a field representing context.

26. The system of claim 25, wherein a clause comprises all of a name, a weight, an operator, and a value.

27. The system of claim 25, wherein the clause comprises a value forming a portion of a Boolean expression, and a name representing an operator used to combine all of the clauses.

28. The system of claim 27, wherein the operator comprises a Boolean operator.

29. The system of claim 27, wherein the operator comprises a "matches all" match that compares two or more values and excludes a document associated with the value if non-matching values are found.

30. The system of claim 27, wherein the operator comprises a "matches" match that compares two or more values, accumulates a score for matches Found, and excludes a document associated with the values if no matches are found.

31. The system of claim 27, wherein the operator comprises an "optional" match that compares two or more values and accumulate a score for matches found.

32. The system of claim 27, wherein the operator comprises an "optional text" match that breaks text strings associated with a document into component words excluding basic words, conjunctions, and prepositions and accumulates a score for matches found.

33. The system of claim 27, wherein the operator comprises a "matches text" match that breaks text strings associated with a document into component words excluding basic words, conjunctions, and prepositions, accumulates a score for matches found, and excludes a document associated with the values if no matches are found.

34. The system of claim 27, wherein the contextual relevance engine further:
   generate a relevance value for each match by combining the relative weight of each matching metadata field and the number of values that match the document of interest for matching:
   if the relevance value for a document exceeds a pre-defined threshold, deems the document to be relevant and includes the document in a list of relevant documents; and
   if the relevance value for a document does not exceed a pre-defined threshold, deems the document to be irrelevant.

35. The system of claim 34, wherein the contextual relevance engine further sorts documents deemed to be relevant, by relevance, from most relevant to least relevant, and presenting, for display to the user, only a top tier of documents deemed to be most relevant.

36. The system of claim 35, wherein any document that matches itself in the list of relevant documents is discarded and is not presented for display to the user.

37. The system of claim 34, wherein each weight is defined as a number from Ito 10 and the threshold is defined as a number from Ito 100.

38. The system of claim 24, wherein a position of a user in a user interface results in the use of a lookup table to identify a matching programmable rule ID from a rules repository, where the rule ED is used to control a contextual relevance algorithm that will be applied in the user interface.

39. The system of claim 24, wherein a user repository containing the library of information may reside fully in a centralized database or at a customer location.

40. The system of claim 39, wherein the user repository, if located at a customer location, is synchronized with the centralized database and its user records on an initial and ongoing basis.

41. The system of claim 27, further comprising generating a relevance value for each match by using the relative weight of each matching metadata field that match the document of interest for matching.

42. The system of claim 27, further comprising generating a relevance value for each match by using the number of values that match the document of interest for matching.

43. The system of claim 27, further comprising generating a relevance value for each match by combining the relative weight of each matching metadata field and the number of values that match the document of interest for matching.

44. The system of claim 41, further comprising:
   if the relevance value for a document exceeds a pre-defined threshold, deeming the document to be relevant and including the document in a list of relevant documents; and
   if the relevance value for a document does not exceed a pre-defined threshold, deeming the document to be irrelevant.

45. The system of claim 42, further comprising:
   if the relevance value for a document exceeds a pre-defined threshold, deeming the document to be relevant and including the document in a list of relevant documents; and
   if the relevance value for a document does not exceed a pre-defined threshold, deeming the document to be irrelevant.

46. The system of claim 43, further comprising:
   if the relevance value for a document exceeds a pre-defined threshold, deeming the document to be relevant and including the document in a list of relevant documents; and
   if the relevance value for a document does not exceed a pre-defined threshold, deeming the document to be irrelevant.

47. A machine-readable storage medium having stored thereon data representing sequences of instruction, the sequences of instructions which, when executed by a processor, cause the processor to:
   maintain a library of information;
   read metadata tagged information about a user's work profile and working context and content within the library of information;
   match the metadata tagged information about content within the library of information to metadata tagged information about one or more of the user's work profile, the user's working context, or other content within the library of information using a one or more programmable rules; and
   deliver to the user a rank ordered set of the most contextually relevant content from the library of information based on the matching of the metadata tagged information, wherein the one or more programmable rules each have a unique identifier (rule ID), a name, and a set of clauses defining the operations of that rule.

48. The machine-readable medium of claim 47, wherein each clause of the set of clauses comprises two or more of:
   a name identifying the metadata field to be matched or operator to be performed;
   a weight to be applied to the metadata field if a match is found;
   an operator to act on the metadata field to be matched; and
   a value for a field representing context.

49. The machine-readable medium of claim 48, wherein a clause comprises all of a name, a weight, an operator, and a value.

50. The machine-readable medium of claim 48, wherein the clause comprises a value forming a portion of a Boolean expression, and a name representing an operator used to combine all of the clauses.

51. The machine-readable medium of claim 50, wherein the operator comprises a Boolean operator.

52. The machine-readable medium of claim 50, wherein the operator comprises a "matches all" match that compares two or more values and excludes a document associated with the value if non-matching values are found.

53. The machine-readable medium of claim 50, wherein the operator comprises a "matches" match that compares two or more values, accumulates a score for matches found, and excludes a document associated with the values if no matches are found.

54. The machine-readable medium of claim 50, wherein the operator comprises an "optional" match that compares two or more values and accumulates a score for matches found.

55. The machine-readable medium of claim 50, wherein the operator comprises an "optional text" match that breaks text strings associated with a document into component words excluding basic words, conjunctions, and prepositions and accumulates a score for matches found.

56. The machine-readable medium of claim 50, wherein the operator comprises a "matches text" match that breaks text strings associated with a document into component words excluding basic words, conjunctions, and prepositions, accumulates a score for matches found, and excludes a document associated with the values if no matches are found.

57. The machine-readable medium of claim 50, wherein the instruction further cause the processor to:
  generate a relevance value for each match by combining the relative weight of each matching metadata field and the number of values that match the document of interest for matching;
  if the relevance value for a document exceeds a pre-defined threshold, deem the document to be relevant and include the document in a list of relevant documents; and
  if the relevance value for a document does not exceed a pre-defined threshold, deem the document to be irrelevant.

58. The machine-readable medium of claim 57, wherein the instructions further cause the processor to sort documents deemed to be relevant, by relevance, from most relevant to least relevant, and presenting, for display to the user, only a top tier of documents deemed to be most relevant.

59. The machine-readable medium of claim 58, wherein any document that matches itself in the list of relevant documents is discarded and is not presented for display to the user.

60. The machine-readable storage medium of claim 57, wherein each weight is defined as a number from 1 to 10 and the threshold is defined as a number from 1 to 100.

61. The machine-readable medium of claim 47, wherein a position of a user in a user interface results in the use of a lookup table to identify a matching programmable rule ID from a rules repository, where the rule ID is used to control a contextual relevance algorithm that will be applied in the user interface.

62. The machine-readable medium of claim 47, wherein a user repository containing the library of information may reside fully in a centralized database or at a customer location.

63. The machine-readable medium of claim 62, wherein the user repository, if located at a customer location, is synchronized with the centralized database and its user records on an initial and ongoing basis.

64. The machine-readable medium of claim 50, further comprising generating a relevance value for each match by using the relative weight of each matching metadata field that match the document of interest for matching.

65. The machine-readable medium of claim 50, further comprising generating a relevance value for each match by using the number of values that match the document of interest for matching.

66. The machine-readable medium of claim 50, further comprising generating a relevance value for each match by combining the relative weight of each matching metadata field and the number of values that match the document of interest for matching.

67. The machine-readable medium of claim 64, further comprising:
  if the relevance value for a document exceeds a pre-defined threshold, deeming the document to he relevant and including the document in a list of relevant documents; and
  if the relevance value for a document does not exceed a predefined threshold, deeming the document to be irrelevant.

68. The machine-readable medium of claim 65, further comprising:
  if the relevance value for a document exceeds a pre-defined threshold, deeming the document to be relevant and including the document in a list of relevant documents; and
  if the relevance value for a document does not exceed a pre-defined threshold, deeming the document to be irrelevant.

69. The machine-readable medium of claim 66, further comprising:
  if the relevance value for a document exceeds a pre-defined threshold, deeming the document to be relevant and including the document in a list of relevant documents: and
  if the relevance value for a document does not exceed a pre-defined threshold, deeming the document to be irrelevant.

70. The machine-readable storage medium claim 47, wherein the contextually relevant content comprise office documents Microsoft Word documents, spreadsheets or presentations.

71. The machine-readable storage medium claim 47, wherein the contextually relevant content comprise rich media content text, images, audio, video and interactive media.

* * * * *

UNITED STATES PATENT AND TRADEMARK OFFICE
CERTIFICATE OF CORRECTION

PATENT NO.       : 7,139,757 B1                                       Page 1 of 1
APPLICATION NO.  : 10/027471
DATED            : November 21, 2006
INVENTOR(S)      : Alex Apollonsky et al.

It is certified that error appears in the above-identified patent and that said Letters Patent is hereby corrected as shown below:

Column 15, line 41, Claim 37, "Ito 10" should be --1 to 100--.

Column 15, line 42, Claim 37, "Ito 10" should be --1 to 100--.

Signed and Sealed this

Tenth Day of April, 2007

JON W. DUDAS
*Director of the United States Patent and Trademark Office*